United States Patent [19]
Kempf et al.

[11] Patent Number: 5,269,673
[45] Date of Patent: Dec. 14, 1993

[54] APPARATUS FOR PREVENTING MOLDED PARTS FROM BEING CONTAMINATED BY LUBRICANT ON TIE BARS IN A RESIN MOLDING MACHINE

[76] Inventors: Joseph Kempf, 427 Hemlock La., Roselle, Ill. 60172; John Diamond, 6409 Ojibwa La., McHenry, Ill. 60050

[21] Appl. No.: 918,246

[22] Filed: Jul. 23, 1992

[51] Int. Cl.⁵ .............................................. B29C 45/84
[52] U.S. Cl. .................................... 425/151; 425/556; 425/DIG. 45
[58] Field of Search ...................... 425/151, 589, 450.1, 425/DIG. 45, 556; 264/334

[56] References Cited
U.S. PATENT DOCUMENTS 4,828,477  5/1989  Uehara .................................. 425/151
4,911,630  3/1990  Uehara .................................. 425/151

*Primary Examiner*—Tim Heitbrink
*Attorney, Agent, or Firm*—McCaleb, Lucas & Brugman

[57] ABSTRACT

An injection molding machine is illustrated with tie bars extending from a stationary die plate. A movable die plate is slidably movable along the tie bars. Corrugated elastic sleeves cover the tie bars and are seated at opposite ends on the die plates to keep molded parts from contacting the tie bars when the mold is open and thereby protect the molded parts from contamination by lubricant on the tie bars. In the embodiment shown, the corrugated sleeve is made of plastic material and is split longitudinally to facilitate assembly. The split sleeve construction enables the sleeves to be assembled sidewise onto the tie bars, and held snugly onto the bars by wires or cable ties.

7 Claims, 6 Drawing Sheets

APPARATUS FOR PREVENTING MOLDED PARTS FROM BEING CONTAMINATED BY LUBRICANT ON TIE BARS IN A RESIN MOLDING MACHINE

BACKGROUND OF THE INVENTION

Injection molding machines for high speed production of plastic items use multiple cavity molds. A typical machine producing plastic bottle caps for example may produce eighty to one hundred caps per injection cycle. At the end of an injection cycle, all the caps will be ejected simultaneously from the mold, and will fall downwardly between the space between tie bars or rods on which the movable mold section is slidably mounted. Unless an expensive and complex guide of some kind is provided, some of the caps occasionally may strike the tie bars which are always copiously covered with lubricant.

There is a growing inclination on the part of some customers to reject a whole shipment if just a few parts are "contaminated" with oil or grease from the tie rods.

To eliminate any possible such contact between molded parts and greasy tie bars, one company supplies a special guide package comprising a fabric guide skirt, chutes, and mold side curtains, to guide the parts directly from the mold, past the greasy tie bars to a container or conveyor in the bottom of the machine. This "package" is expensive, costing in the neighborhood of $200.00 and requires a special one for each different size injection molding machine.

SUMMARY OF THE INVENTION

By contrast, the present invention is more effective, easier and cheaper to install, one size may fit different size machines, and can be priced in the neighborhood of $10.00 which is low enough to be expendable as part of the cost of a production run without taking the trouble and expense to clean it between runs.

Accordingly, a primary object of the present invention is to provide simple and inexpensive apparatus for preventing contact between ejected, molded articles and the tie bars in an injection molding machine.

Another object is to prevent fouling of injection-molded articles by lubricant on the tie bars of an injection molding machine.

Another object of the invention is to provide a corrugated elastic sleeve covering each tie bar of an injection molding machine and seated at opposite ends on stationary and movable die plates to prevent any possible contaminating contact between molded articles and the tie bars.

Another object is to provide such a corrugated elastic sleeve which is slit lengthwise to enable the sleeve to be assembled sidewise onto a tie rod.

Another object is to provide such a corrugated elastic sleeve with at least one lengthwise slit and having circumferentially overlapped portions along the length of the sleeve alongside the slit.

Another object is to provide such a corrugated elastic sleeve in which the overlapped portions along the margins of the slit have corrugations which are nested together.

Another object is to provide such a corrugated elastic sleeve including circumferential cable ties and the like spaced at intervals along the sleeve to maintain portions of the sleeve along the margins of the slit in predetermined circumferentially overlapped relation.

Another object is to provide such a corrugated elastic sleeve which is elastically compressibly seated at opposite ends against the die plates to maintain sealing engagements between the sleeve and die plates during the entire range of movement between open and closed positions.

GENERAL DESCRIPTION OF THE DRAWINGS

Other objects and advantages will be apparent from the accompanying drawings in which FIG. 1 is a front view of a known injection molding machine with which the present invention may be employed;

Like parts are designated by like reference characters throughout the drawings.

DETAILED DESCRIPTION OF THE PREFERRED EMBODIMENT

Figure 1:
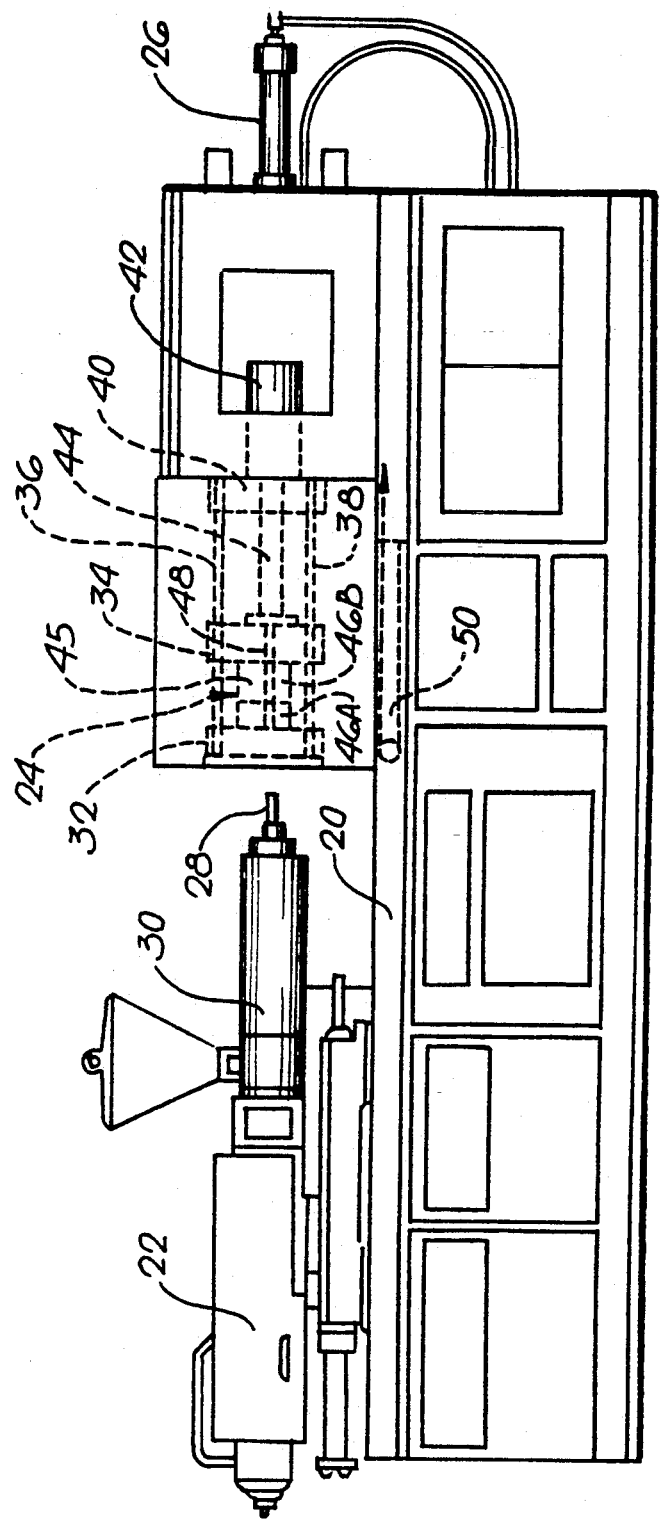

Referring now more specifically to the drawings, FIG. 1 shows a known and commonly used injection molding machine having a frame 20, an injection mechanism section 22, a mold clamping mechanism 24, and a hydraulic drive section 26.

The injection mechanism section 22 injects a molten resin material from an injection nozzle 28 provided at one end of a heating cylinder 30 through a main sprue (not shown) into a mold generally designated 45 comprising stationary and movable sections 46A and 46B.

The mold clamping mechanism 24 includes a stationary die plate 32, a movable die plate 34, an upper pair of tie bars, 36, 36 and a lower pair of tie bars 38, 38 extending between the stationary die plate 32 and a stationary head plate 40. The movable die plate 34 is slidably mounted at the four corners thereof on the tie bars 36, 38 and is movable by hydraulic cylinder 42 and piston rod 44.

Figure 2:
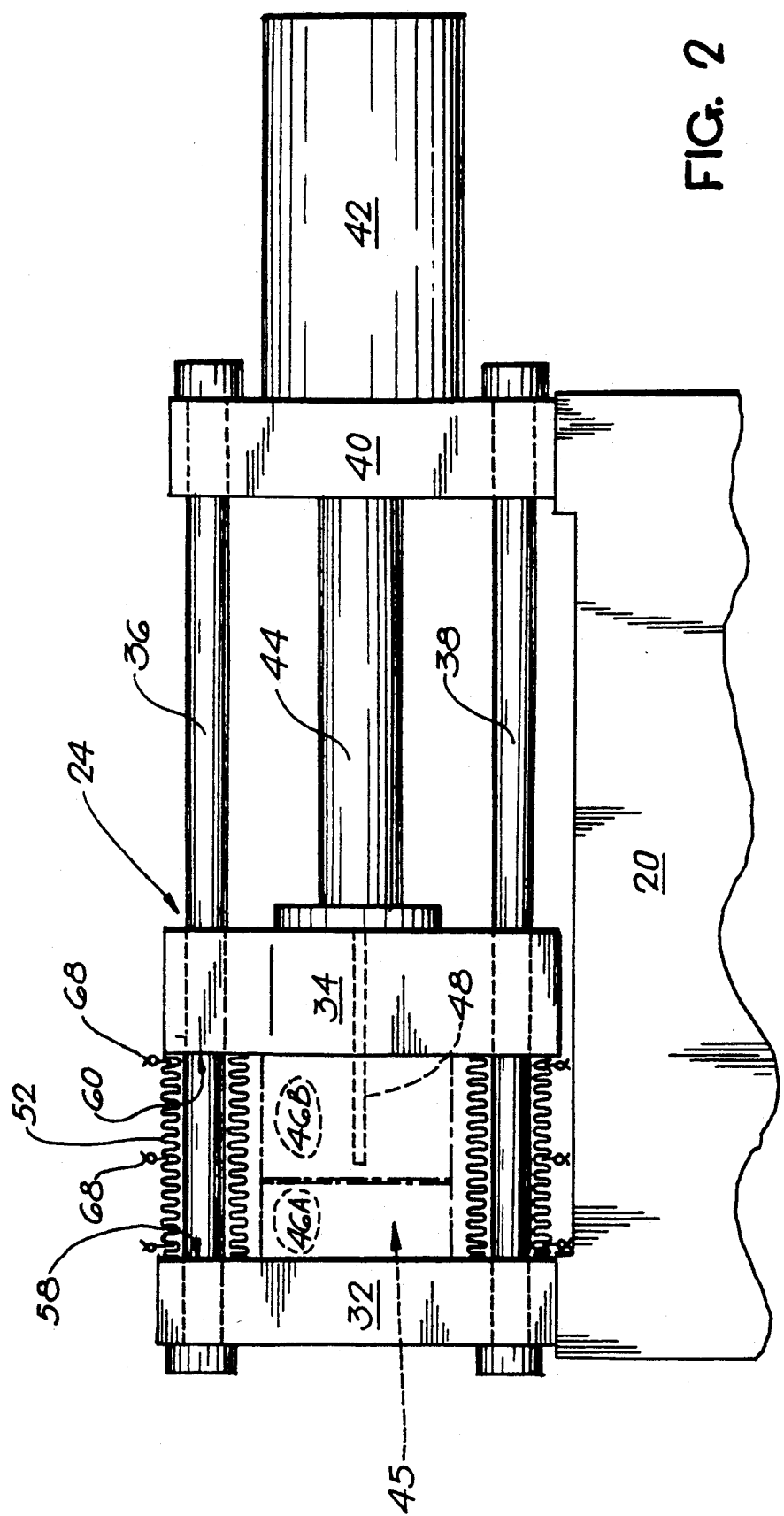
FIG. 2 is a fragmentary, enlarged view of FIG. 1 showing the mold clamping mechanism with a preferred form of the present invention, the mold being shown in closed position.

The stationary mold section 46A is mounted on the stationary die plate 32, and the movable mold section 46B is mounted in registration therewith on the movable die plate 34. After the mold 45 is closed as shown in FIG. 2 and filled by injection through nozzle 28, it is opened by cylinder 42 to the position shown in FIG. 3. At that time, the molded articles 49 are pushed from the molds by an ejector 48 causing them to drop between the tie bars and through a chute 51 onto a conveyor 50 (FIGS. 1 and 3) or other container in the frame.

With multiple cavity molds, a typical injection molding machine may, for example, produce 80 to 100 plastic items such as bottle caps per injection cycle, every ten seconds. This comprises a torrent of molded parts, some of which may be soiled by contact with lubricant on the tie bars 36, 38 if they engage them.

In the present invention, the tie bars are covered completely by sleeves 52 so lubricant which is copiously present on them cannot foul any of the molded parts.

Each sleeve 52 may be molded of polyethylene which is inherently elastic. Each has corrugations 54 and may have flanges 56, 56 at opposite ends which are seated against the surfaces 58 and 60 of the stationary and movable die plates 32 and 34 respectively. However, such flanges are not essential to the practice of this invention.

Figure 11:
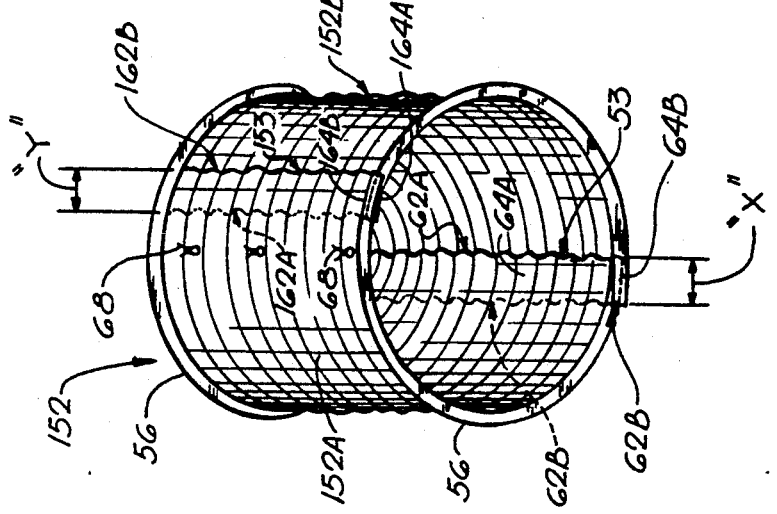
FIG. 11 is a view similar to FIG. 9 showing an alternative form of the invention.
Figure 4:
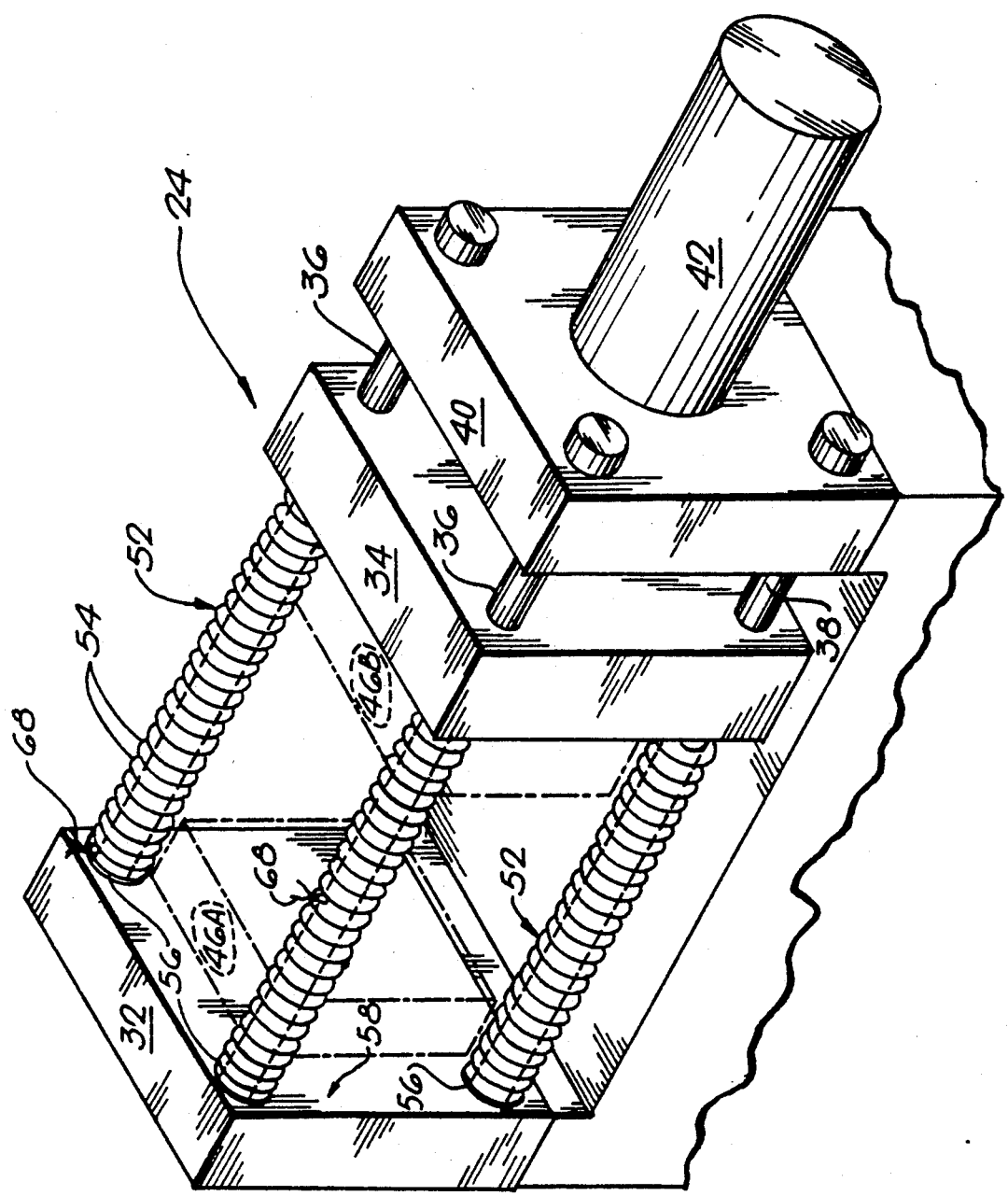
FIG. 4 is a perspective view of FIG. 3.
Figure 5:
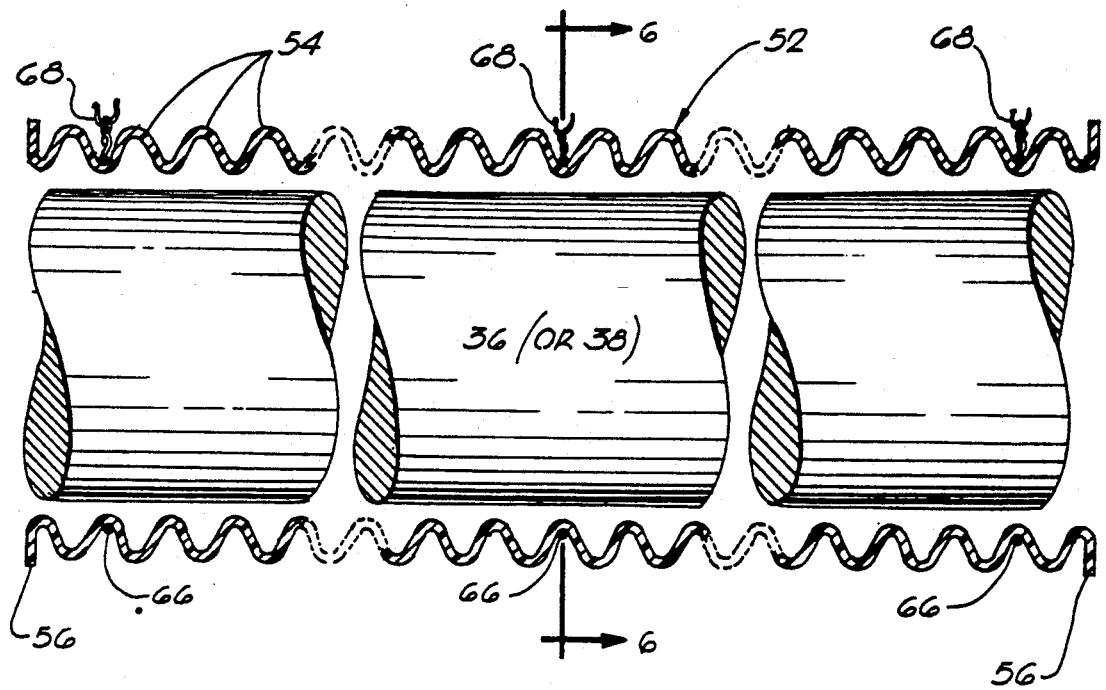
FIG. 5 is a fragmentary enlarged view of FIG. 3 showing a longitudinal cross section of the invention.
Figure 6:
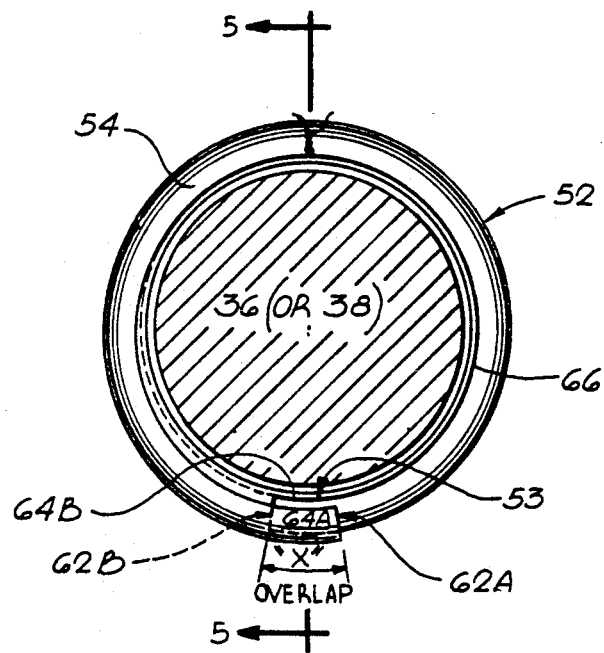
FIG. 6 is a cross-sectional view of FIG. 5 taken on line 6—6.
Figure 7:
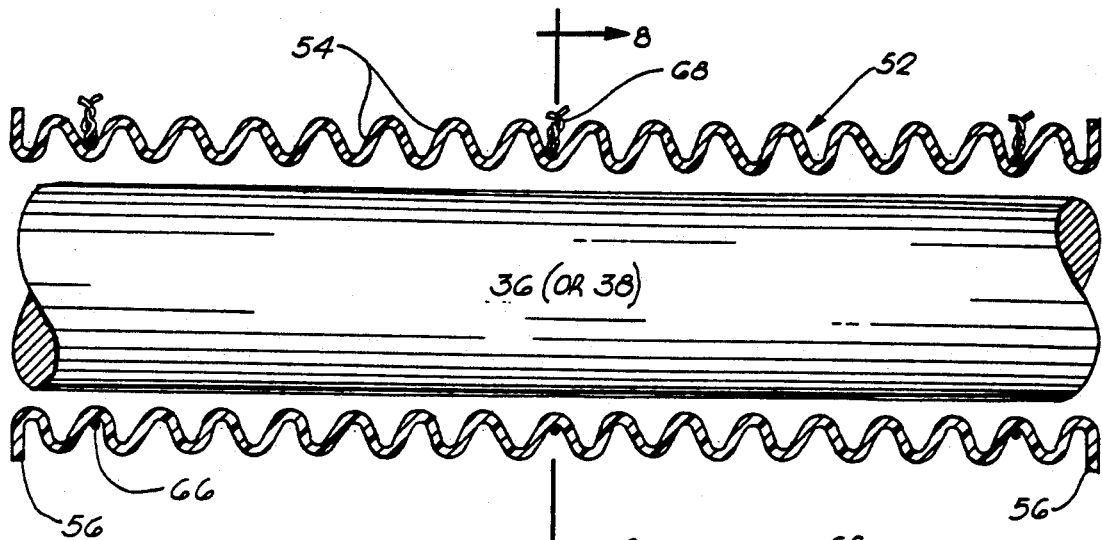
FIG. 7 is a view similar to FIG. 5 showing the invention applied to a smaller diameter die rod.
Figure 9:
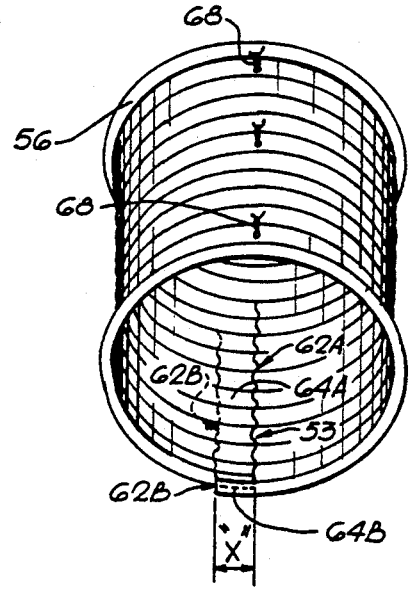
FIG. 9 is a perspective view of the corrugated plastic sleeve shown in the previous figures.
Figure 8:
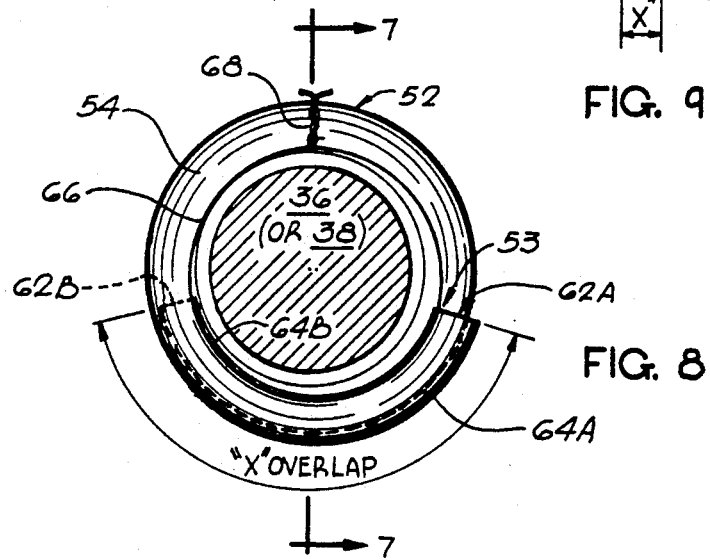
FIG. 8 is a cross-sectional view of FIG. 7 taken on line 7—7.

Each sleeve 52 is longitudinally slit at 53 to provide edges 62A, 62B as shown in FIGS. 6, 8 and 9. The sleeve edge portions 64A, and 64B adjacent the slit are overlapped as shown at "X" (FIGS. 6, 8 and 11). The extent of this overlap depends on the relative circumferences of the sleeve and its respective tie bar. For a given circumference of sleeve, the overlap "X" will vary inversely in proportion to the circumference of the respective tie bar. For example, the overlap "X" is small where the circumference of the tie bar 36 (or 38) is large relative to the sleeve as shown in FIG. 6. The overlap "X" is large where the same size sleeve 52 is fitted over a smaller tie bar as shown in FIG. 8.

Alternatively, the sleeve may be a plurality of separate, overlapped, partial cylindrical sections as shown in FIG. 11 which is identical with FIG. 9 except that the sleeve 152 is in two pieces 152A and 152B. In addition to the bottom slit 53 defining longitudinal edges 62A and 62B as described above, there is a top slit 153 defining longitudinal edges 162A and 162B with overlapped edge portions 164A and 164B.

A wire or cable tie 66 may be tightened around the sleeve at intervals to hold it assembled in overlapped condition about the tie bar. Each wire or tie may be twisted or clamped as shown at 68. Alternatively, prefabricated cable ties of predetermined length may be used. One source of such predetermined length cable ties is Panduit Corporation, Tinley Park, Illinois.

Figure 3:
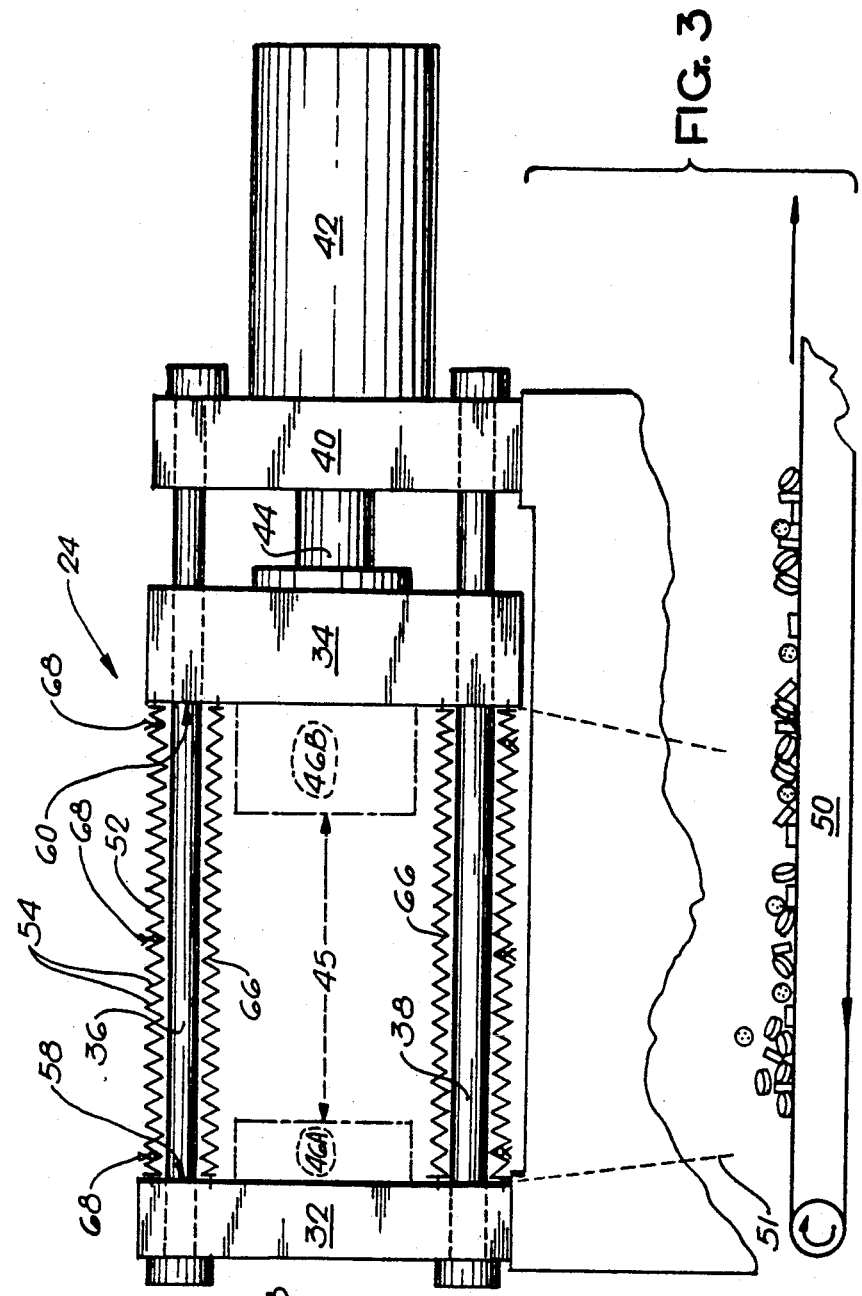
FIG. 3 is a view similar to FIG. 2 in open position.

The sleeves 52 will be selected of a suitable initial axial length that will fit between, and compressibly seat against, the inside surfaces 58 and 60 of the die plates 32 and 34 when they are fully open as shown in FIG. 3. This initial, axial sleeve length, combined with the natural elasticity of the polyetheylene material, and, the bellows construction, keeps the end flanges 56 seated and substantially sealed against the die plate surfaces 58 and 60 throughout the entire opening and closing operating cycle. If any molded parts scatter when the mold is opened, the sleeves effectively protect them from contacting any of the tie bars 36, 38, so the parts remain perfectly clean, and uncontaminated by grease on the tie bars.

Because of their split construction, the sleeves 52 or 152 may be assembled sidewise quickly and easily onto the tie bars 36 and 38 without removing the bars or either of the die plates. As a preliminary step, the cylinder 42 is actuated to fully open the mold 45 as shown in FIG. 3. Next, in the example of the one-piece sleeve 52, it is opened along the slit edges 62A, 62B and is slid sidewise onto the tie bar 36 or 38 in the direction of the arrows shown in FIG. 10. Then, wires or ties 66, or prefabricated cable ties, are fastened at 68 at intervals along the tie rods with a suitable overlap "X" (or "X" and "Y" for the FIG. 11 embodiment) to hold them snugly in place.

Figure 10:
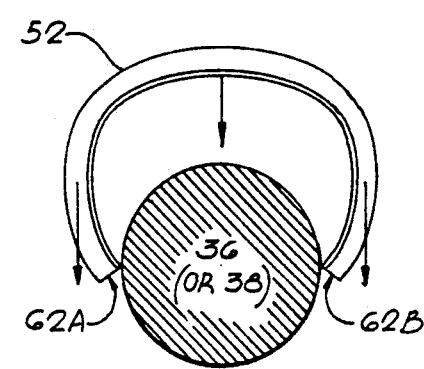
FIG. 10 is a cross-sectional view showing one of the plastic sleeves being assembled sidewise onto a tie bar.

In its basic aspect, the present invention comprises enclosing each tie bar 36 and 38 with an elastically compressible sleeve 52 which is seated and sealed against the stationary and movable die plates 32 and 34 respectively. The invention is therefore not limited to the longitudinal slitted constructions described, or to the specific corrugated improvement having a special advantage, namely the capability of being installed sidewise as shown in FIG. 10.

The embodiments described and shown to illustrate the present invention have been necessarily specific for purposes of illustration. Alterations, extensions and modifications would be apparent to those skilled in the art. The aim of the appended claims, therefore, is to cover all variations included within the spirit and scope of the invention.

The embodiments of the invention in which an exclusive property or privilege is claimed are defined as follows:

1. In a resin molding machine including tie bars extending from a stationary die plate supporting a stationary mold section, a movable die plate supporting a movable mold section and being movable along the tie bars between a closed position in which the mold sections are closed against one another and an open position in which the mold sections are spaced apart sufficiently to release molded parts, the improvement comprising apparatus for preventing molded parts from contamination by lubricant during ejection from the mold sections, said apparatus comprising:

axially elastically compressible sleeves each enclosing a corresponding tie bar and seated and sealed at opposite ends on the stationary and movable die plates respectively.

2. In a resin molding machine including tie bars extending from a stationary die plate supporting a stationary mold section, a movable die plate supporting a movable mold section and being movable along the tie bars between a closed position in which the mold sections are closed against one another and an open position in which the mold sections are spaced apart sufficiently to release molded parts, the improvement comprising apparatus for preventing molded parts from contamination by lubricant during ejection from the mold sections, said apparatus comprising:

longitudinally split corrugated elastic sleeves each covering a corresponding tie bar and seated at opposite ends on the stationary and movable die plates respectively.

3. In a resin molding machine, apparatus according to claim 2 in which:

each corrugated elastic sleeve has a slit extending completely along the axial length of the sleeve, and said slit can be temporarily elastically opened to exceed the diameter of the corresponding tie rod and thereby enable the sleeve to be assembled sidewise onto the tie rod.

4. In a resin molding machine, apparatus according to claim 3 in which the margins of the slit comprise circumferentially overlapped portions along the length of the sleeve.

5. In a resin molding machine, apparatus according to claim 4 in which the circumferentially overlapped portions of the sleeve along said margins have corrugations which are nested together.

6. In a resin molding machine, apparatus according to claim 4 including circumferential ties spaced along the length of the sleeve to maintain said margins circumferentially overlapped along the length of the sleeve.

7. In a resin molding machine, apparatus according to claim 2 in which the sleeve is axially elastically compressible to maintain a positive engagement with the die plates throughout the entire range of movement of the movable die plate between said open and closed positions.

* * * * *